(12) United States Patent
Maeda et al.

(10) Patent No.: US 6,851,638 B2
(45) Date of Patent: Feb. 8, 2005

(54) ROTATION SUPPORT STRUCTURE FOR DUAL-BEARING REEL

(75) Inventors: Mitsuyo Maeda, Sakai (JP); Yasuhiro Hitomi, Hashimoto (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/418,279

(22) Filed: Apr. 18, 2003

(65) Prior Publication Data

US 2003/0209621 A1 Nov. 13, 2003

(30) Foreign Application Priority Data

May 7, 2002 (JP) ........................................ 2002-132006

(51) Int. Cl.⁷ .............................................. A01K 89/15
(52) U.S. Cl. ........................ 242/321; 242/320; 242/322; 384/133
(58) Field of Search ................................ 242/321, 320, 242/319, 322; 384/101, 102, 133

(56) References Cited

U.S. PATENT DOCUMENTS

| | | | |
|---|---|---|---|
| 4,352,474 A | * 10/1982 | Kovalovsky | ................ 242/265 |
| 5,129,739 A | 7/1992 | Asai et al. | |
| 5,134,331 A | * 7/1992 | Miyaji et al. | ................. 310/90 |
| 5,161,900 A | * 11/1992 | Bougathou et al. | ......... 384/133 |
| 5,207,396 A | * 5/1993 | Furomoto | ................... 242/321 |
| 5,372,324 A | 12/1994 | Sato | |
| 5,402,953 A | 4/1995 | Sato | |
| 5,683,183 A | * 11/1997 | Tanaka et al. | ............. 384/100 |
| 5,848,843 A | * 12/1998 | Lee | ............................ 384/101 |
| 2002/0125358 A1 | * 9/2002 | Takikura | ..................... 242/319 |

FOREIGN PATENT DOCUMENTS

JP 02300515 A * 12/1990 ........... F16C/17/04

* cited by examiner

*Primary Examiner*—Eileen D. Lillis
*Assistant Examiner*—Evan Langdon
(74) *Attorney, Agent, or Firm*—Shinjyu Global IP Counselors, LLP

(57) ABSTRACT

A rotation support structure for a dual-bearing reel includes a reel unit, a spool shaft, and fluid bearings. The spool shaft is disposed on an inner circumferential side of the reel unit and can rotate relative to the reel unit. The fluid bearings have a plurality of grooves for forming a fluid lubricant film between the reel unit and the spool shaft. The rotation support structure is provided for a high-speed rotation operation of a dual-bearing reel, with which a reduction of the rotation performance during high-speed rotation can be successfully suppressed.

1 Claim, 7 Drawing Sheets

ROTATION SUPPORT STRUCTURE FOR DUAL-BEARING REEL

BACKGROUND OF THE INVENTION

1. Field of the Invention

This invention generally relates to rotation support structures. More specifically, the present invention relates to rotation support structures for high-speed rotating components of dual-bearing reels.

2. Background Information

Dual-bearing reels, and in particular bait casting reels and electrically-driven reels, are equipped with components that rotate at high speeds. In the case of bait casting reels, the spool rotates at high speeds of about 20,000 rpm when casting. To support the components rotating at these high speeds, ball bearings, which are rolling bearings, are conventionally used.

When using ball bearings as a support structure for rotating components, the rotation performance may decrease, since ball bearings have a tiny rotation resistance. For example, if a spool of a bait casting reel is supported by a ball bearing, then the flying distance may decrease due to the rotation resistance during casting. Conventionally, to address this problem, a contact portion that contacts the inner race of the ball bearing with a small gap therebetween, is formed on the spool shaft. The contact portion is formed with a width that is smaller than the width of the inner race. During high-speed rotation of the spool, the inner race and the contact portion are caused to slide, and during low-speed of the spool, the spool is supported by the ball bearing at the contact portion.

With the conventional rotation support structure using a ball bearing, the inner race and the contact portion slide during high-speed rotation, so that the rotation resistance between the inner race and the ball bearing can be ignored, and a reduction of the rotation performance can be better suppressed than when there is no sliding. However, since sliding occurs between the inner race and the contact portion during high-speed rotation, friction is generated at this portion. For this reason, some reduction in the rotation performance due to friction losses occurs after all.

In view of the above, there exists' a need for rotation support structure for a dual-bearing reel which overcomes the above mentioned problems in the prior art. This invention addresses this need in the prior art as well as other needs, which will become apparent to those skilled in the art from this disclosure.

SUMMARY OF THE INVENTION

It is thus a purpose of the present invention to provide a support structure for a high-speed rotation portion of a dual-bearing reel, with which a reduction of the rotation performance during high-speed rotation can be successfully suppressed.

In a rotation support structure for a dual-bearing reel according to the first aspect of the invention, a support structure for a high-speed rotation portion of a dual-bearing reel includes a first component, a second component, and a fluid bearing. The second component is disposed on an inner circumferential side of the first component and can rotate relative to the first component. The fluid bearing is disposed between the first and second components for forming a fluid lubricant film between the two components.

With this rotation support structure, a fluid bearing is provided that contactlessly supports the two components by forming a fluid lubricant film between the first component and the second component. Here, the first component and the second component are linked by the fluid bearing. Therefore, the rotation resistance becomes smaller than for a support structure with a ball bearing. Also, no friction occurs between solid bodies, so that also the friction resistance is reduced. Therefore, a reduction of the rotation performance can be successfully averted. Furthermore, it is possible to form the fluid bearing as a one-piece, unitary member with the components. Therefore, there is no need for a special accommodation space. Accordingly, it is possible to prevent the dual-bearing reel from becoming large.

According to the rotation support structure for a dual-bearing reel of the second aspect of the present invention, the structure according to the first aspect further includes one of a rolling bearing and a sliding bearing arranged between the first component and the second component. The fluid bearing is disposed between an outer circumferential surface of the second component and an inner circumferential surface of the one of the rolling bearing and sliding bearing. With this configuration, even when the second component is rotated with respect to the rolling bearing or sliding bearing, the second component is supported by the one of the rolling bearing and the sliding bearing during low-speed rotation, and by the fluid bearing during high-speed rotation. Accordingly, a reduction of the rotation performance can be averted in all rotation regions, including low-speed rotation such as when winding up line and high-speed rotation such as when casting.

According to the rotation support structure for a dual-bearing reel of the third aspect of the present invention, in the structure according to the first or the second aspect, the fluid lubricant film formation means has a plurality of groove portions formed in an outer circumferential surface of the second component, which rotates with respect to the first component. With this configuration, the rotation stability can be improved and a high rotation precision can be maintained by forming grooves in the outer circumferential surface of the second component, which rotates with respect to the first component.

According to the rotation support structure for a dual-bearing reel of fourth aspect of the present invention, in the structure according to the second or the third aspect, the first component is a reel unit of the dual-bearing reel, the second component is a spool shaft rotatively supported by the reel unit, and the fluid bearing is disposed on at least one end of the spool shaft. With this configuration, a reduction of the rotation performance of the spool rotating together with the spool shaft with respect to the reel unit can be successfully averted, and the reel can be made more compact.

According to the rotation support structure for a dual-bearing reel of the fifth aspect of the present invention, the structure according to the first aspect further includes a rolling bearing or a sliding bearing arranged between the first component and the second component, and the fluid bearing is disposed between an inner circumferential surface of the first component and an outer circumferential surface of the one of the rolling bearing and sliding bearing. With this configuration, even when the first component is rotated with respect to the one of the rolling bearing and the sliding bearing, the first component is supported by the rolling bearing or sliding bearing during low-speed rotation and by the fluid bearing during high-speed rotation. Accordingly, a reduction of the rotation performance can be averted in all rotation regions, including low-speed rotation such as when winding up line and high-speed rotation such as when casting.

According to the rotation support structure for a dual-bearing reel of the sixth aspect of the present invention, in the structure according to the first through fifth aspects, the fluid bearing has a plurality of groove portions formed in an inner circumferential surface of the first component, which rotates with respect to the second component. With this configuration, the rotation stability can be improved and a high rotation precision can be maintained by forming grooves in the outer circumferential surface of the first component, which rotates with respect to the second component.

According to the rotation support structure for a dual-bearing reel of the seventh aspect of the present invention, in the structure according to the fifth or sixth aspect, the first component is a spool rotating with respect to a reel unit of the dual-bearing reel, while the second component is a spool shaft mounted non-rotatively to the reel unit and piercing the center of the spool. The fluid bearing is disposed on at least one end of the spool. With this configuration, a reduction of the rotation performance of the spool rotating together with the spool shaft can be successfully averted, and the spool and the reel can be made more compact.

According to the rotation support structure for a dual-bearing reel of the eighth aspect of the present invention, the structure according to any of the first through seventh aspects further includes a seal member that seals a gap between the first component and the second component on at least one side of the fluid bearing. With this configuration, the inside of the fluid bearing is sealed by a seal member, so that fluctuations in the dynamic pressure or the static pressure due to the intrusion of foreign matter can be averted, and problems due to the intrusion of foreign matter can be prevented.

According to the rotation support structure for a dual-bearing reel of the ninth aspect of the present invention, in the structure according to the eighth aspect, the seal member is a low-friction seal. With this configuration, a low-friction seal with little rotation loss is used for the seal member, so that reductions of the rotation performance due to the seal member can be averted.

According to the rotation support structure for a dual-bearing reel of the tenth aspect of the present invention, in the structure according to the ninth aspect, the low-friction seal is a magnetic seal having a magnetic fluid that is held by either of the two components. With this configuration, the intrusion of foreign matter can be efficiently prevented with the magnetic seal using a magnetic fluid, and in case of a fluid bearing using a fluid different from air, can also function to hold the fluid in addition to sealing.

According to the rotation support structure for a dual-bearing reel of the eleventh aspect of the present invention, in the structure according to the ninth aspect, the low-friction seal is a water-repellent seal having a water-repellent film layer that is arranged on a portion facing away from at least one of the two components. With this configuration, the seal member is made of a water-repellent film layer, so that, in particular, the intrusion of liquids such as freshwater and saltwater can be prevented effectively, and the corrosion resistance of the components can be maintained easily.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
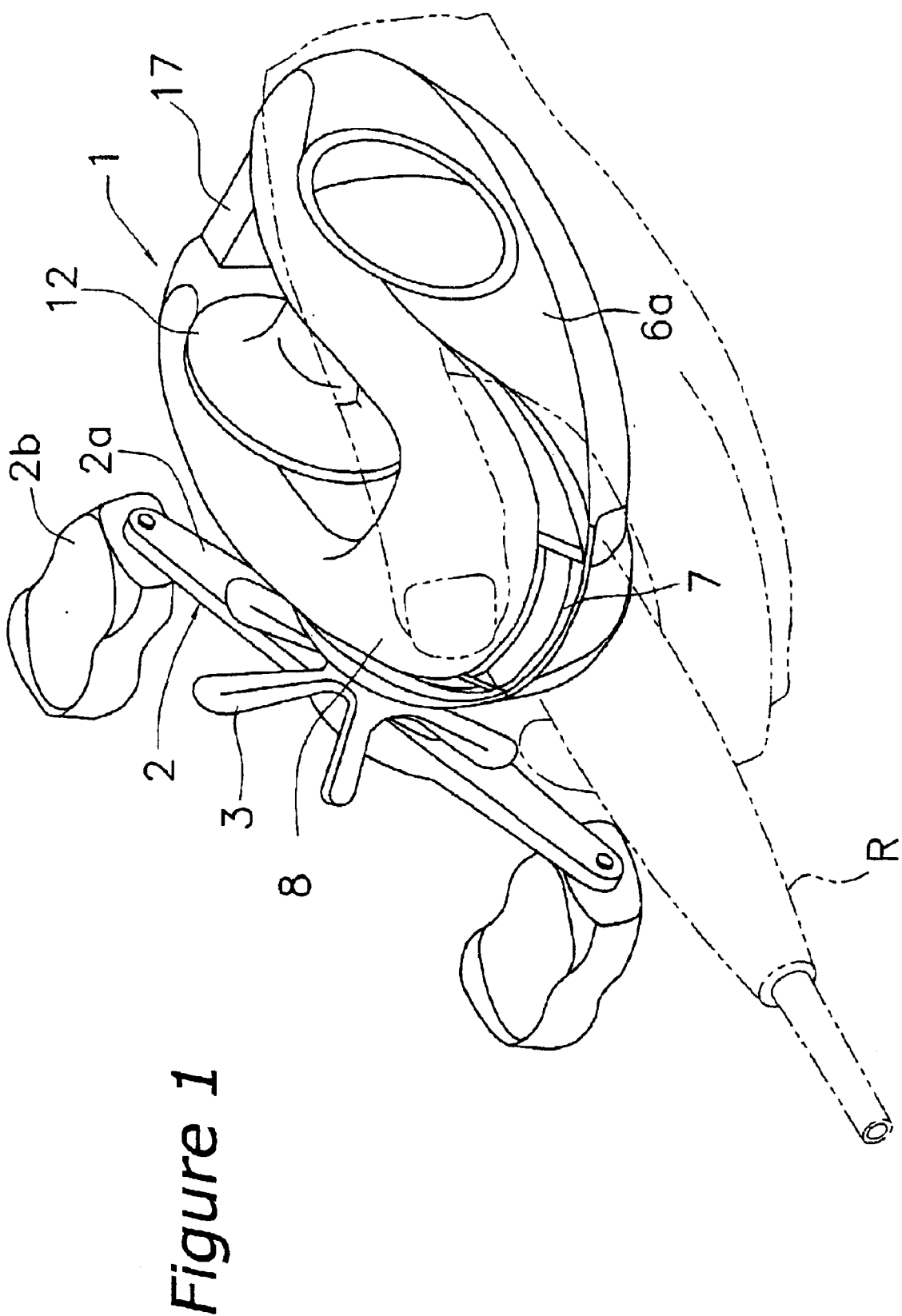
FIG. 1 is a perspective view of a dual-bearing reel according to one embodiment of the present invention.
Figure 2:
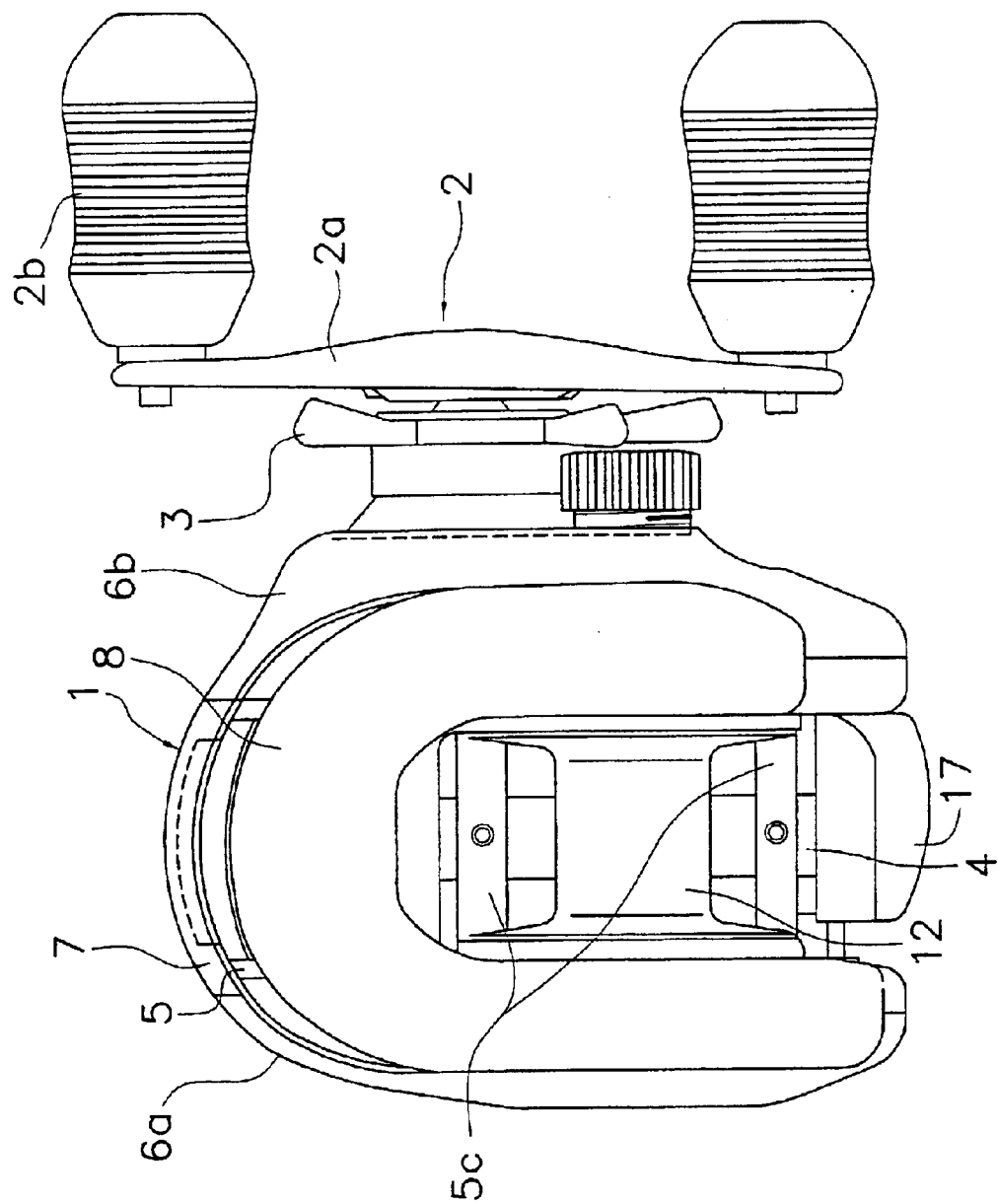
FIG. 2 is a plan view of the dual-bearing reel according to the embodiment of the present invention.

As shown in FIGS. 1 and 2, a dual-bearing reel employing a seal mechanism in accordance with an embodiment of the present invention is a low-profile type reel for bait casting. This reel includes a reel unit 1, a spool rotation handle 2 that is mounted to one side of the reel unit 1 and a spool 12 for winding fishing line in response to rotation of the handle 2, which is mounted rotatively and detachably to the inside of the reel unit 1. A star drag 3 for adjusting drag is disposed on the same side of the reel unit 1 as the handle 2.

Figure 3:
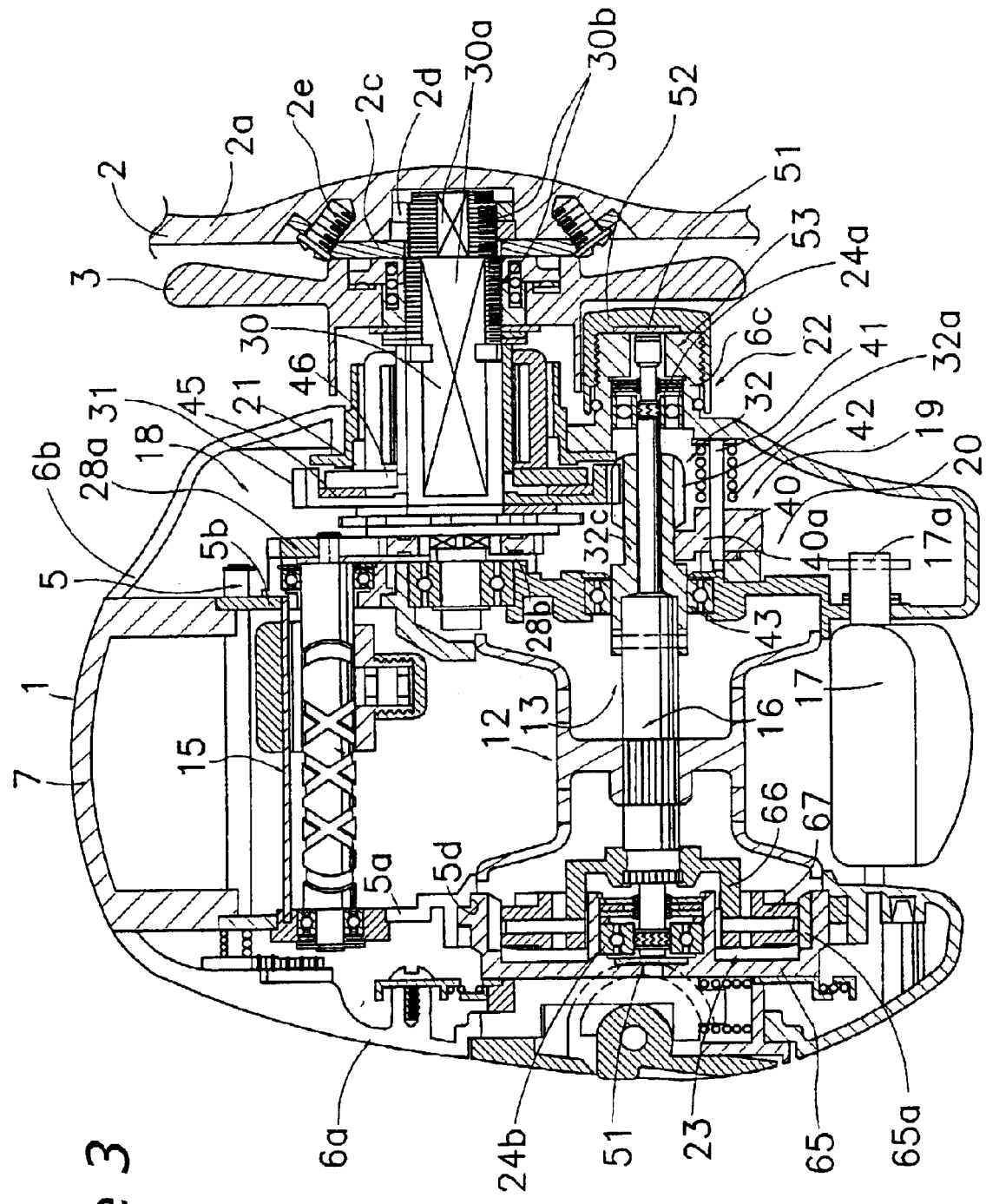
FIG. 3 is a plan cross-sectional view of the dual-bearing reel according to the embodiment of the present invention.

The handle 2 is of the double-handle type and has a plate-shaped handle arm 2a and grips 2b that are attached rotatively to both ends of handle arm 2a. As shown in FIG. 3, the handle arm 2a is fastened with two screws 2e to a base plate 2c that is fastened non-rotatively to the near end of a handle shaft 30 with a nut 2d. This nut 2d is accommodated inside the handle arm 2a, so as not to rotate. In this manner, the outer lateral surface of the handle arm 2a can be configured as a seamless smooth surface, achieving a structure in which fishing line does not easily get caught up.

As shown in FIG. 3, the reel main unit 1 has a frame 5, and a first side cover 6a and a second side cover 6b that are mounted to both sides of the frame S. Furthermore, as shown in FIG. 1 and FIG. 2, the reel unit 1 also has a front cover 7 covering the front and a thumb rest 8 covering the top portion. The frame 5 includes a pair of side plates 5a and 5b disposed in opposition to each other at a predetermined spacing, and a plurality of connecting portions 5c connecting the side plates 5a and 5b, as shown in FIGS. 2 and 3. A leg mounting portion 4 with a certain horizontal length for mounting the reel to a fishing rod R is fastened with screws to two connecting portions 5c on the lower side.

The first side cover 6a can be opened or closed with respect to the frame 5, and is mounted pivotally to the frame 5 to make it possible to attach and detach the spool 12. The second side cover 6b is screwed to the frame 5. The front cover 7 is mounted between the side plates 5a and 5b at the front of the reel unit 1.

As shown in FIG. 3, the spool 12, a level wind mechanism 15 and a clutch lever 17 are disposed inside the frame 5. The spool 12 is arranged perpendicularly to the fishing rod R. The level wind mechanism 15 is for uniformly winding fishing line around the spool 12. The clutch lever 17 is where the thumb is placed during pitching. A gear mechanism 18, a clutch mechanism 13, a clutch engage/disengage mechanism 19, an engage/disengage control mechanism 20, a drag mechanism 21, and a casting control mechanism 22 are disposed in the space between the frame 5 and the second side cover 6b. The gear mechanism 18 transmits rotational force from the handle 2 to the spool 12 and the level wind mechanism 15. The clutch engage/disengage mechanism 19 engages and disengages the clutch mechanism 13. The engage/disengage control mechanism 20 controls the engaging and disengaging of the clutch mechanism 13 in response to the operation of the clutch lever 17. The casting control mechanism 22 adjusts the resistance that develops when the spool 12 rotates. Also, a centrifugal braking mechanism 23 for preventing backlash when casting is disposed between the frame 5 and the first side cover 6a.

Figure 4:
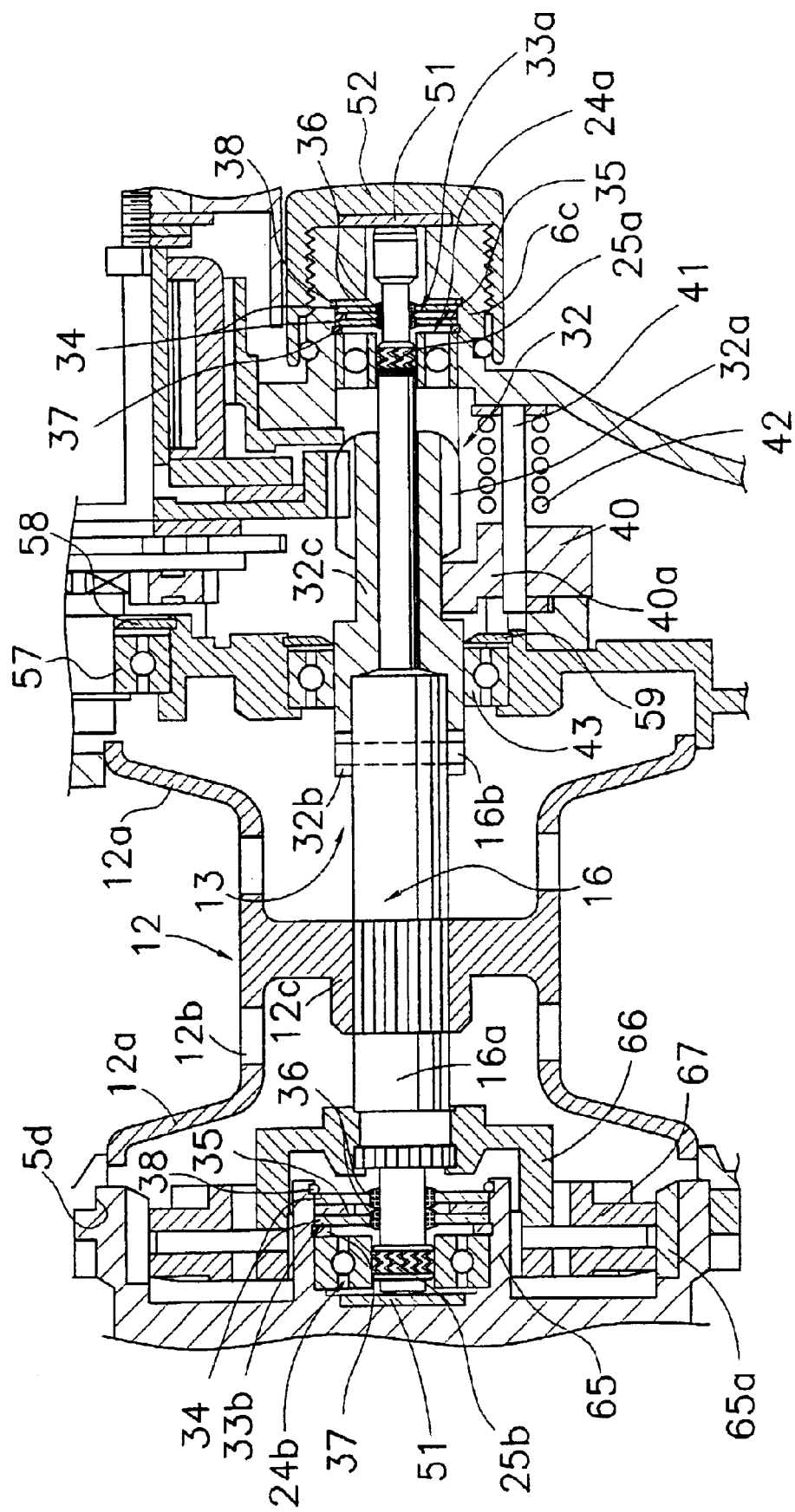
FIG. 4 is a magnified cross-sectional view of the spool support portion according to the embodiment of the present invention.

As shown in FIG. 4, the spool 12 has saucer-shaped flange portions 12a on both ends and a cylindrical bobbin portion 12b between the two flange portions 12a. The spool 12 also has a cylindrical boss 12c. The cylindrical boss 12c is formed on the inner side of the bobbin portion 12b at substantially the center with respect to the axial direction as a one-piece unitary member with the bobbin portion 12b. The spool 12 is fixed non-rotatively, for example by serration coupling, to a spool shaft 16 penetrating the boss 12c. The fixation is not limited to serration coupling, and other coupling methods such as key coupling or spline-coupling can be employed as well.

The spool shaft 16 penetrates the side plate 5b and extends outward beyond the second side cover 6b. This end of the spool shaft 16 is supported rotatively with a ball bearing 24a and a fluid bearing 25a at a boss 6c, which is provided at the second side cover 6b. The other end of the spool shaft 16 is supported rotatively with a ball bearing 24b and a fluid bearing 25b at a brake case 65 (explained below) inside the centrifugal braking mechanism 23. Here, a small gap is formed between the outer circumferential surface of the spool shaft 16 and the inner races of the ball bearings 24a and 24b. The fluid bearings 25a and 25b are formed in this small gap. This way, the fluid bearings 25a and 25b are operatively disposed between the reel unit 1 and the spool 12. Moreover, during relatively slow rotation, for example when winding up fishing line, the ball bearings 24a and 24b support the spool shaft 16, whereas the fluid bearings 25a and 25b support the spool shaft 16 during relatively fast rotation, for example when casting. As shown in FIG. 4, magnetic seals 33a and 33b are disposed to the outer axial side of the ball bearing 24a and to the inner axial side of the ball bearing 24b.

Figure 5:
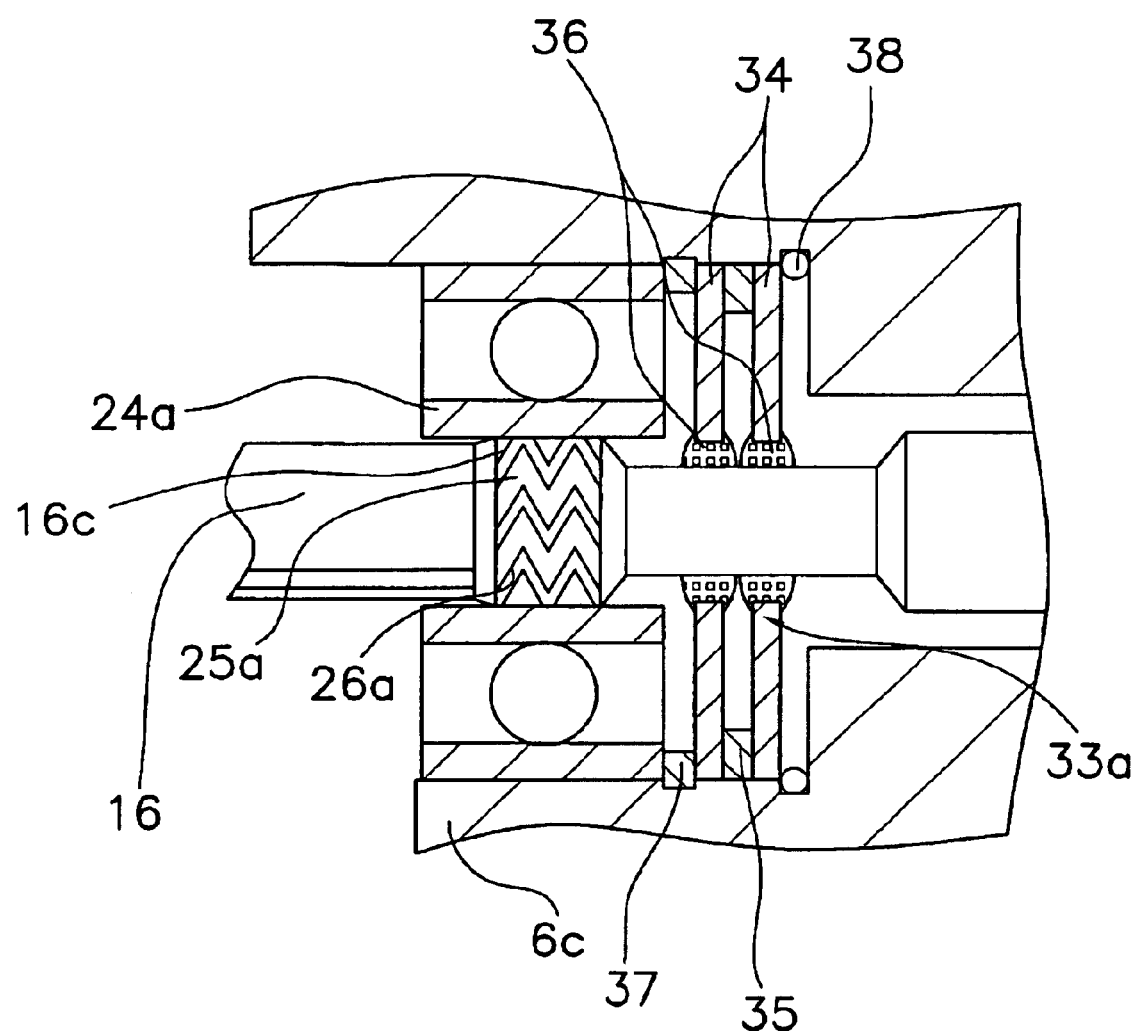
FIG. 5 is a partial cross-sectional view of a fluid bearing support portion according to the embodiment of the present invention.

As shown in FIG. 5, the fluid bearings 25a and 25b have dynamic pressure generation grooves 26a in which a lubricant film of air serving as a fluid is formed between the inner circumferential surface of the ball bearings 24a and 24b and the outer circumferential surface of the spool shaft 16. The lubricant film of air is formed at the outer circumferential surface of the portion of the spool shaft 16 where the bearings are mounted to generate dynamic pressure in the radial direction. As seen in FIG. 5. the spool shaft 16 has a stepped portion 16c having a greater diameter than that of the rest of the stepped portion 16. The dynamic pressure generation grooves 26a is formed on the stepped portion 16c of the spool shaft 16. The dynamic pressure generation grooves 26a, which generate dynamic pressure in the radial direction, have for example a triangular zig-zag pattern and are provided with a shape that generates dynamic pressure when the spool 12 is rotated fast in the direction letting off fishing line. The dynamic pressure generation grooves 26a rotatively support the spool shaft 16 while leaving a gap to the inner race of the ball bearings 24a and 24b. The dynamic pressure generation grooves 26a are formed by any of the machining methods known in the art, such as mechanical machining including laser engraving, by electrolytic machining using an electrode, or by a thin film formation process such as PYD (physical vapor deposition). Since these methods of forming grooves are well known in the art, detailed explanations of these methods are omitted herein. A stable rotation performance can be attained by keeping the machining precision of the fluid bearings 25a and 25b; in other words the machining precision of the inner circumferential surface of the inner race of the ball bearings 24a and 24b and the outer circumferential surface of the portions of the spool shaft 16 where the bearings are mounted, to not more than 5 $\mu$m, preferably not more than 2 $\mu$m, and even more preferably not more than 1 $\mu$m.

Thus, since the fluid bearings 25a and 25b, which can support the spool shaft 16 rotatively but without contact, are provided between the inner race of the ball bearing 24a and 24b and the spool shaft 16, it is possible to suppress reductions of the rotation performance during high-speed rotation, and to prevent a reduction of the flying distance during casting.

The magnetic seal 33a includes a pair of magnetic holding rings 34, a ring magnet 35, and a magnetic fluid 36. The pair of magnetic holding rings 34 is fastened to the boss 6c at a certain spacing in the axial direction on the outer side of the ball bearing 24a. The ring magnet 35 is sandwiched by the two magnetic holding rings 34. The magnetic fluid 36 is disposed between the magnetic holding rings 34 and the spool shaft 16. The magnetic seal 33a seals the gap between the spool shaft 16 and the boss 6c by holding the magnetic fluid 36 in a magnetic circuit constituted by the ring magnet 35, the magnetic holding rings 34 and the spool shaft 16.

A locking ring 37 for positioning the outer race of the ball bearing 24a is fitted between the inner (left hand side in FIG. 4) magnetic holding ring 34 and the ball bearing 24a. In outward axial direction from the outer magnetic holding ring 34, an 0-ring 38 is disposed between the magnetic holding ring 34 and the boss 6c. The magnetic fluid 36 has ferromagnetic particles of several nm to several dozen nm dispersed stably, by using a surface active agent, in a solvent of hydrocarbon oil or fluorine oil. This magnetic seal 33a surrounds the spool shaft 16 with a fluid, so that the magnetic seal 33a can seal hermetically. Furthermore, since there is no solid contact at the sealing portions, no dust is generated. Moreover, since there is no solid sliding at the sealing portions, the loss-inducing torque is small and there is hardly any reduction in rotation performance.

The magnetic seal 33b has a similar configuration as the magnetic seal 33a, and also includes a pair of magnetic holding rings 34, a ring magnet 35, and a magnetic fluid 36. The ring magnet 35 is sandwiched by the two magnetic holding rings 34. The magnetic fluid 36 is disposed between the magnetic holding rings 34 and the spool shaft 16. A locking ring 37 for positioning the outer race of the ball bearing 24b is disposed between the outer (left hand side in FIG. 4) magnetic holding ring 34 and the ball bearing 24b. Inward from the inner magnetic holding ring 34, an O-ring 38 is fitted between the magnetic holding ring 34 and the brake case 65.

The right end of a large diameter portion 16a of the spool shaft 16 is disposed at a portion where the side plate 5b is pierced. An engaging pin 16b, which is part of the clutch mechanism 13, is fixed in the spool shaft 16 at this place. The engaging pin 16b pierces the large diameter portion 16a through its diameter and protrudes radially from both sides.

Referring to FIG. 3, the gear mechanism 18 includes the handle shaft 30, a main gear 31 fixed to the handle shaft 30, a cylindrical pinion gear 32 meshing with the main gear 31, a gear 28a linked to the level wind mechanism, and a gear 28b that is fixed non-rotatively to the handle shaft 30 and meshes with the gear 28a. The vertical position of the handle shaft 30 of this gear mechanism 18 is lower than the conventional position, in order to lower the height of the thumb rest 8. Thus, the lower portions of the side plate 5b and the second cover 6b, which house the gear mechanism 18, are positioned below the lower portions of the side plate 5a and the first side cover 6a. The front end of the handle shaft 30 has a reduced diameter. A parallel beveled portion 30a and an externally threaded portion 30b are formed on a large diameter portion and a small diameter portion of the front end.

The base end (left end in FIG. 4) of the handle shaft 30 is supported by the side plate 5b with a bearing 57. An elastic ripped seal member 58 is fitted to the inner side of the base end of the handle shaft 30.

The pinion gear 32 has a teethed portion 32a, a meshing portion 32b and a constricted portion 32c. The teethed portion 32a is formed on the outer circumferential portion on the right end in FIG. 3 and meshes with the main gear 31. The meshing portion 32b is formed at the end on the other side. The constricted portion 32c is formed between the teethed portion 32a and the meshing portion 32b. The meshing portion 32b is made of a depression groove that is formed in the end surface of the pinion ear 32 along its diameter, and this is where the engagement pin 16b is passed through the spool shaft 16 and fastened. The pinion gear 32 is supported by the side plate 5b with a bearing 43. An elastic ripped seal member 59 is fitted to the inner side of the bearing 43.

Here, when the pinion gear 32 is moved outward, and the meshing portion 32b and the engagement pin 16b in the spool shaft 16 are uncoupled, the rotational force from the handle shaft 30 is not transmitted to the spool 12. The meshing portion 32b and the engagement pin 16b constitute the clutch mechanism 13. When the engagement pin 16b and the meshing portion 32b are engaged, then torque is transmitted directly from the large-diameter pinion gear 32, whose diameter is larger than that of the spool shaft 16, to the spool shaft 16, so that twisting deformations are reduced and the torque transmission efficiency is improved.

As shown in FIG. 2, the clutch lever 17 is disposed at the rear end of the pair of side plates 5a and 5b behind the spool 12. A long hole (not shown in the drawings) is formed in the side plates 5a and 5b of the frame 5, and a rotation shaft 17a of the clutch lever 17 is supported rotatively by this long hole. Thus, the clutch lever 17 can slide vertically along the long hole.

As shown in FIG. 3, the clutch engage/disengage mechanism 19 includes a clutch yoke 40. The clutch yoke 40 is disposed on the outer circumferential side of the spool shaft 16, and is supported by two pins 41 (only one of which is shown in the figure), such that the clutch yoke 40 can be shifted parallel to the axis of the spool shaft 16. It should be noted that the spool shaft 16 can rotate relatively to the clutch yoke 40. That is to say, even when the spool shaft 16 rotates, the clutch yoke 40 does not rotate. Furthermore, the clutch yoke 40 has an engaging portion 40a at its center portion, and the constricted portion 32c of the pinion gear 32 is engaged with this engaging portion 40a. Moreover, springs 42 are disposed around the pins 41 supporting the clutch yoke 40, between the clutch yoke 40 and the second side cover 6b. The clutch yoke 40 is constantly biased inward by the springs 42.

With this configuration, in the ordinary state, the pinion gear 32 is positioned in an inward clutch-engaging position, in a clutch-on state in which the meshing portion 32b and the engagement pin 16b of the spool shaft 16 are engaged. On the other hand, when the pinion gear 32 is shifted outward by the clutch yoke 40, the meshing portion 32b and the engagement pin 16 are disengaged, assuming a clutch-off state.

The drag mechanism 21 includes a star drag 3 for adjusting the drag force, a friction plate 45 that is pressed against the main gear 31, and a pressure plate 46 for pressing the friction plate 45 with a predetermined pressure against the main gear 31 when the star drag 3 is rotated. The star drag 3 is configured to make a sound when it is turned.

As shown in FIG. 3, the casting control mechanism 22 includes a plurality of friction plates 51 and a braking cap 52. The friction plates 51 are disposed on both ends of the spool shaft 16. The braking cap 52 is for adjusting the force with which the friction plates 51 are pressed against the spool shaft 16. The right friction plate 51 is provided inside the braking cap 52, and the left friction plate 51 is provided inside the brake case 65.

As shown in FIG. 3, the centrifugal braking mechanism 23 includes a brake case 65, a rotating member 66 and sliders 67. The brake case 65 is part of the reel unit 1. The rotating member 66 is disposed in the brake case 65. The sliders 67 are attached to the rotating member 66 at certain intervals in the circumferential direction and are movable in the radial direction. A cylindrical brake liner 65a is fixed to the inner peripheral surface of the brake case 65 and can be brought into contact with the sliders 67. The brake case 65 is mounted detachably to a circular aperture 5d formed in the side plate 5a, and pivots together with the first side cover 6a.

The following is an explanation of the way this reel is operated.

In the ordinary state, the clutch yoke 40 is pressed inward (to the left in FIG. 3) by the springs 42, and this causes the pinion gear 32 to shift into the engaging position. In this state, the meshing portion 32b of the pinion gear 32 and the engagement pin 16b of the spool shaft 16 are engaged in the clutch-on state, and rotational force from the handle 2 is transmitted to the spool 12 via the handle shaft 30, the main gear 31, the pinion gear 32 and the spool shaft 16, rotating the spool 12 in the direction taking up fishing line. During this low-speed rotation of winding up line, the spool shaft 16 is supported by the ball bearings 24a and 24b.

When casting, the braking force is adjusted in order to suppress backlash. Here, it is preferable to adjust the braking force in accordance with the mass of the lure (tackle). More specifically, the braking force is increased when the lure is heavy, and it is decreased when the lure is light. The adjustment of the braking force in order to suppress backlash is performed with the casting control mechanism 22 or the centrifugal braking mechanism 23.

When the adjustment of the braking force is finished, the clutch lever 17 is pushed downward. Here, the clutch lever 17 is shifted downward to the disengaged position along the long holes in the side plates 5a and 5b. By shifting the clutch lever 17, the clutch yoke 40 is shifted outward, and the pinion gear 32, which was engaged with the clutch yoke 40, is shifted in the same direction. As a result, the meshing portion 32b of the pinion gear 32 and the engagement pin 16b of the spool shaft 16 are disengaged into the clutch-off state. In this clutch-off state, the rotation from the handle shaft 30 is not transmitted to the spool 12 and the spool shaft 16, and the spool 12 rotates freely. When the reel is tilted in the axial direction with the spool shaft 16 aligned with the vertical plane and the fishing rod is swung, while putting the spool into the clutch-off state with the thumb resting on the clutch lever 17, then the lure is flung out, and the spool 12 turns in the direction reeling off line at a high speed of, for example, 20,000 rpm. During this high-speed rotation in the direction reeling off line, dynamic pressure is generated by the fluid bearings 25a and 25b, and the spool shaft 16 is supported by the fluid bearings 25a and 25b. Thus, the spool shaft 16 is not only supported by the fluid bearings 25a and 25b, but it is also sealed by the magnetic seals 33a and 33b, so that the rotation performance tends not to be decreased, and the spool 12 can be rotated with high momentum, and the flying distance of the lure becomes long.

In this situation, the spool shaft 16 rotates in the direction reeling off line, due to the rotation of the spool 12, and this rotation is transmitted to the rotating member 66. When the rotating member 66 rotates, the sliders 67 come into sliding contact with the brake liner 65a, and the spool 12 is braked by the centrifugal braking mechanism 23. At the same time, the spool shaft 16 is braked by the casting control mechanism 22, so that backlash can be prevented.

When the tackle hits the water, the handle 2 is turned. This leads to the clutch-on state, due to a return mechanism not shown in the drawings. In this state, the retrieving motion is repeated, and one waits for a catch. When a fish bites, the handle 2 is rotated to wind up the fishing line. In this situation, it may be necessary to adjust the drag force, depending on the size of the catch. The drag force can be adjusted by turning the star drag 3 clockwise or counterclockwise.

Figure 6:
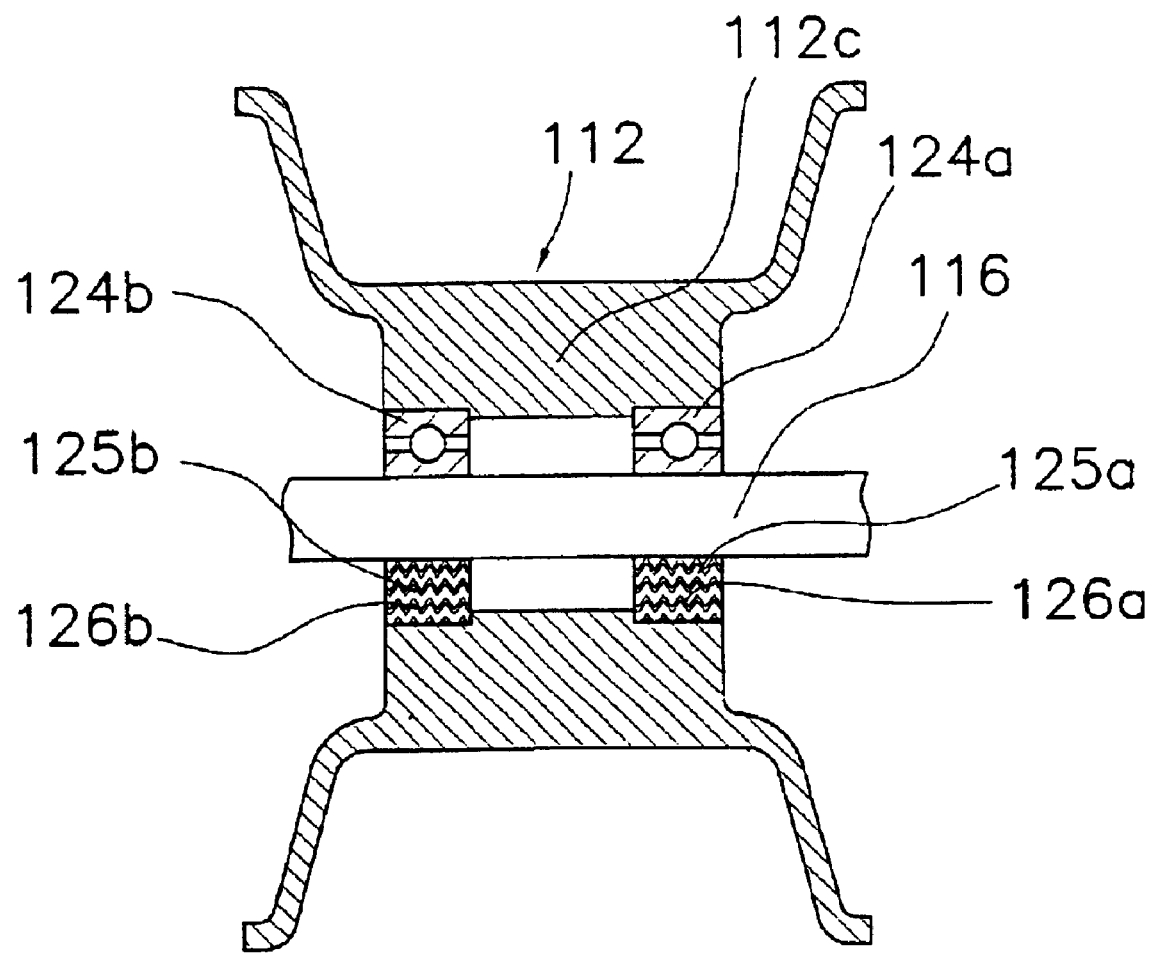
FIG. 6 is a partial cross-sectional view of a rotation support portion according to another embodiment of the present invention.

Other Embodiments (a) The configuration of the fluid bearings of this invention is not limited to the embodiment described above. For example, as shown in FIG. 6, if a spool 112 is mounted rotatively with respect to a spool shaft 116, then it is also possible to mount fluid bearings 125a and 125b between the spool shaft 116 and the spool 112. In the embodiment shown in FIG. 6, ball bearings 124a and 124b are mounted between the spool shaft 116 and the spool 112. A tiny gap is formed between the outer race of the ball bearings 124a and 124b and the inner circumferential surface of the spool 112, and the fluid bearings 125a and 125b are disposed therein. More specifically, dynamic pressure generation grooves 126a and 126b constituting fluid bearings 125a and 125b are formed at both ends of the inner circumferential surface of the boss 112c of the spool 112. It should be noted that in FIG. 6, for illustrative reasons, the ball bearings 124a and 124b are shown above the spool shaft 116, whereas below the spool shaft 116, the ball bearings 124a and 124b are not shown, but the fluid bearings 125a and 125b are shown.

With this configuration, the same effects as with the above-described embodiments can be attained.

(b) The bearings are not limited to ball bearings, and may also be other types of rolling bearings such as needle bearings and roller bearings, or sliding bearings such as bushings.

Figure 7:
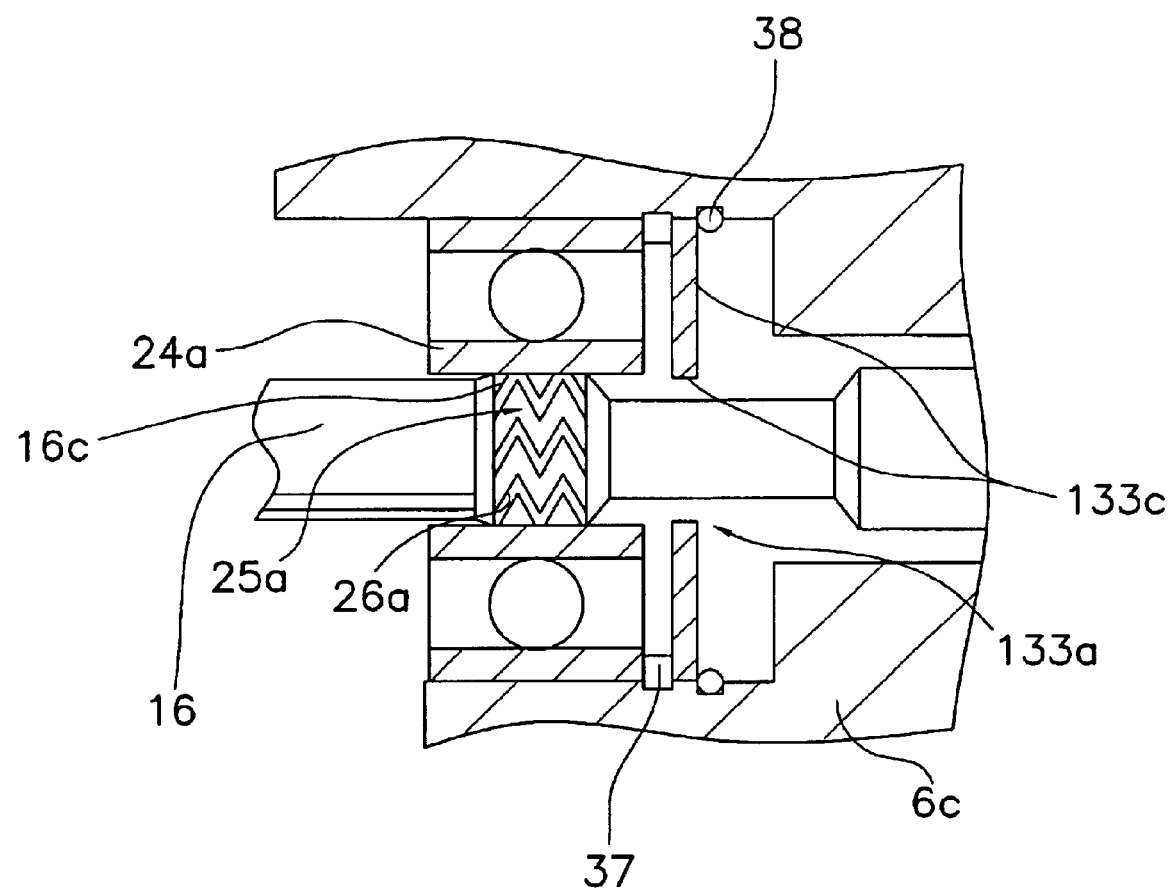
FIG. 7 is a partial cross-sectional view of a rotation support portion according to still another embodiment.

(c) In the above-described embodiments, a magnetic seal was shown as an example of a low-friction seal disposed between the two components, but the seal material is not limited to magnetic seals; any configuration is possible as long as it is a seal material with which the intrusion of foreign matter can be prevented from between the two components. For example, as shown in FIG. 7, it is also possible to use a water-repellent seal 133a, as shown in FIG. 7. This water-repellent seal 133a is a disk-shaped member made of metal or synthetic resin. The water repellent seal 133a is mounted to the inner circumferential surface of the boss 6c at the place where the boss 6c faces the spool shaft 16. A water-repellent film layer 133c is formed on the surface of the water-repellent seal 133a that faces away from the fluid bearing 25a and on its inner circumferential surface. The water-repellent film layer 133c may be, for example, a water-repellent metal thin film that has been impregnated with a silicon resin or a fluorine resin or the like. It should be noted that instead of forming the water-repellent seal as a separate member, it can also be formed in one piece with at least one of the two components.

Furthermore, any contact-type seal is appropriate, as long as it is a seal with which the rotation resistance can be reduced, such as a lipped seal.

(d) In the foregoing embodiments, a fluid bearing using air as a fluid was given as an example, but the fluid may be of any kind. For example, a magnetic fluid can be used as the fluid, as well as for the sealing purpose. Furthermore, using a lubricant oil or the like improves the rotation performance even more.

If such a fluid other than air is used, then it is necessary to arrange a fluid drainage prevention means, such as a seal member or a holding member, on both ends of the fluid bearing to prevent the fluid from being drained out. In the case of a magnetic fluid, the fluid is held by magnetic force, so that it is easy to configure a fluid drainage prevention means.

(e) In the foregoing embodiments, a dynamic pressure fluid bearing in which a fluid lubricant film was formed by rotation was used, but it is also possible to use a static pressure fluid bearing, in which the fluid lubricant film is formed by supplying the fluid from a compressor.

With the present invention, a first component and a second component are linked by a fluid bearing. Accordingly, the rotation resistance becomes smaller than in a support structure with ball bearings, and no friction occurs between solid bodies, so that also the friction resistance is reduced. Therefore, a reduction of the rotation performance can be successfully averted.

As used herein, the following directional terms "forward," "rearward," "above," "downward," "vertical," "horizontal," "below" and "transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2002-132006. The entire disclosure of Japanese Patent Application No. 2002-132006 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A rotation support structure for a dual-bearing reel, comprising:

a first component;

a second component that is disposed on an inner circumferential side of said first component such that said first and second components are rotatable relative to one another;

one of a rolling bearing and a sliding bearing arranged between said first component and said second component;

a fluid bearing disposed between said first and second components for forming a fluid lubricant film between said first and second components, said fluid bearing being disposed between an outer circumferential surface of said second component and an inner circumferential surface of said one of rolling bearing and sliding bearing; and a seal member that seals a gap between said first component and said second component on at least on one side of said fluid bearing, wherein said seal member includes a low-friction seal, and said low-friction seal includes a water-repellent seal having a water-repellent film layer that is arranged on at least one of the said first and second components.

* * * * *